Figure 1:
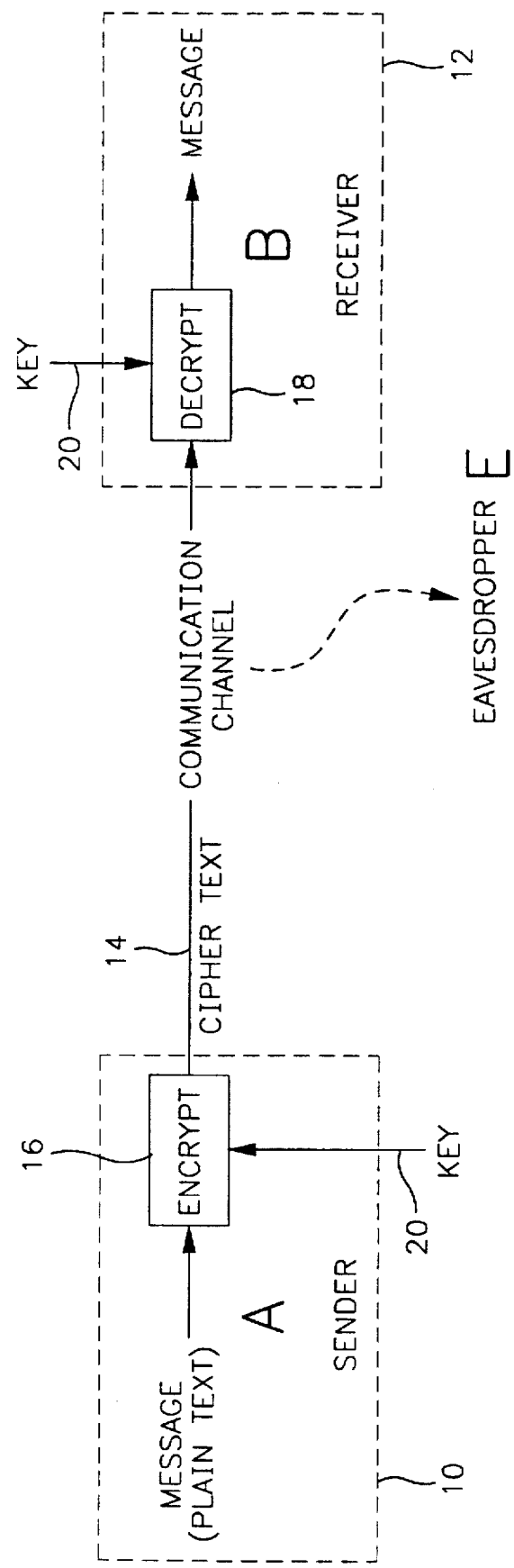

United States Patent [19]
Vanstone et al.

[11] Patent Number: 5,761,305
[45] Date of Patent: Jun. 2, 1998

[54] KEY AGREEMENT AND TRANSPORT PROTOCOL WITH IMPLICIT SIGNATURES

[75] Inventors: Scott Vanstone, Waterloo, Canada; Alfred John Menezes, Auburn, Ala.; Minghua Qu, Waterloo, Canada

[73] Assignee: Certicom Corporation, Ontario, Canada

[21] Appl. No.: 442,833

[22] Filed: May 17, 1995

Related U.S. Application Data

[63] Continuation-in-part of Ser. No. 426,712, Apr. 21, 1995.

[51] Int. Cl.$^6$ ................ H04L 9/08; H04L 9/30
[52] U.S. Cl. ................ 380/21; 380/23; 380/30; 380/49
[58] Field of Search ................ 380/21, 23, 25, 380/30, 49, 50

[56] References Cited

U.S. PATENT DOCUMENTS

| | | |
|---|---|---|
| 4,200,770 | 4/1980 | Hellman et al. |
| 4,405,829 | 9/1983 | Rivest et al. |
| 4,956,863 | 9/1990 | Goss .................. 380/30 |
| 5,299,263 | 3/1994 | Beller et al. .......... 380/30 |
| 5,406,628 | 4/1995 | Beller et al. .......... 380/30 |

FOREIGN PATENT DOCUMENTS

| | | | |
|---|---|---|---|
| 0393806 | 10/1990 | European Pat. Off. | H04L 9/32 |
| 0639907 | 2/1995 | European Pat. Off. | H04L 9/32 |
| 3915262 | 11/1989 | Germany | G09C 5/00 |

OTHER PUBLICATIONS

"Authentication and Authenticated Key Exchanges", by W. Diffie et al; Designs, Codes, and Cryptography; vol. 2, No. 2; Jun. 1992; pp. 107–125.

B. Schneier, *Applied Cryptography;* (ZNDED., Manuscript Submitted Arp. 1995; pp. 496–498 & 513–522).

Boyd et al., *Design and Analysis of Key Exchange Protocols Via Secure Channel Identification*, Advances in Cryptology—Asiacrypt '94, pp. 171–181 (Nov. 1994).

Horster et al., *Meta–ElGamel Signature Schemes*, Theoretical Computer Science and Information Security, University of Technology Chemnitz–Zwickau, Strasse der Nationen 62, D–09111 Chemnitz, Germany, pp. 96–107 (May 1994).

Horster et al., *Meta–Message Recovery and Meta–Blind Signature Schemes Based on the Discrete Logarithm Problem and Their Applications*, Advances in Cryptology—Asiacrypt '94, pp. 224–237 (Nov. 1994).

Matsumoto et al., *On Seeking Smart Public–Key–Distribution Systems*, Trans. IECE of Japan, vol. E69, No. 2, pp. 99–106 (Feb. 1986).

Nyberg et al., *Message Recovery For Signature Schemes Based on the Discrete Logarithm Problem*, Advances in Cryptology—Eurocrypt '94, pp. 182–193 (May 1994).

Schneier, *Applied Cryptography*, 2nd Edition, pp. 496–522, John Wiley & Sons (1996).

*Primary Examiner*—Bernarr E. Gregory
*Attorney, Agent, or Firm*—Baker, Maxham, Jester & Meador

[57] ABSTRACT

A key establishment protocol between a pair of correspondents includes the generation by each correspondent of respective signatures. The signatures are derived from information that is private to the correspondent and information that is public. After exchange of signatures, the integrity of exchange messages can be verified by extracting the public information contained in the signature and comparing it with information used to generate the signature. A common session key may then be generated from the public and private information of respective ones of the correspondents.

17 Claims, 1 Drawing Sheet

KEY AGREEMENT AND TRANSPORT PROTOCOL WITH IMPLICIT SIGNATURES

REFERENCE TO RELATED APPLICATIONS

This is a continuation-in-part of U.S. application Ser. No. 08/426,712, filed Apr. 21, 1995, entitled: "Key Agreement and Transport Protocol with Implicit Signatures".

The present invention relates to key agreement protocols for transfer and authentication of encryption keys.

To retain privacy during the exchange of information it is well known to encrypt data using a key. The key must be chosen so that the correspondents are able to encrypt and decrypt messages but such that an interceptor cannot determine the contents of the message.

In a secret key cryptographic protocol, the correspondents share a common key that is secret to them. This requires the key to be agreed upon between the correspondents and for provision to be made to maintain the secrecy of the key and provide for change of the key should the underlying security be compromised.

Public key cryptographic protocols were first proposed in 1976 by Diffie-Hellman and utilized a public key made available to all potential correspondents and a private key known only to the intended recipient. The public and private keys are related such that a message encrypted with the public key of a recipient can be readily decrypted with the private key but the private key cannot be derived from the knowledge of the plaintext, ciphertext and public key.

Key establishment is the process by which two (or more) parties establish a shared secret key, called the session key. The session key is subsequently used to achieve some cryptographic goal, such as privacy. There are two kinds of key agreement protocol; key transport protocols in which a key is created by one party and securely transmitted to the second party; and key agreement protocols, in which both parties contribute information which jointly establish the shared secret key. The number of message exchanges required between the parties is called the number of passes. A key establishment protocol is said to provide implicit key authentication (or simply key authentication) if one party is assured that no other party aside from a specially identified second party may learn the value of the session key. The property of implicit key authentication does not necessarily mean that the second party actually possesses the session key. A key establishment protocol is said to provide key confirmation if one party is assured that a specially identified second party actually has possession of a particular session key. If the authentication is provided to both parties involved in the protocol, then the key authentication is said to be mutual; if provided to only one party, the authentication is said to be unilateral.

There are various prior proposals which claim to provide implicit key authentication.

Examples include the Nyberg-Rueppel one-pass protocol and the Matsumoto-Takashima-Imai (MTI) and the Goss and Yacobi two-pass protocols for key agreement.

The prior proposals ensure that transmissions between correspondents to establish a common key are secure and that an interloper cannot retrieve the session key and decrypt the ciphertext. In this way security for sensitive transactions such as transfer of funds is provided.

For example, the MTI/A0 key agreement protocol establishes a shared secret K, known to the two correspondents, in the following manner:

1. During initial, one-time setup, key generation and publication is undertaken by selecting and publishing an appropriate system prime p and generator $\alpha \in Z_p^*$ in a manner guaranteeing authenticity. Correspondent A selects as a long-term private key a random integer "a", $1 < a < p-1$, and computes a long-term public key $z_A = \alpha^a \bmod p$. B generates analogous keys b, $z_B$. A and B have access to authenticated copies of each other's long-term public key.

2. The protocol requires the exchange of the following messages.

$$A \to B: \alpha^x \bmod p \quad (1)$$
$$A \to B: \alpha^y \bmod p \quad (2)$$

The values of x and y remain secure during such transmissions as it is impractical to determine the exponent even when the value of a and the exponentiation is known provided of course that p is chosen sufficiently large.

3. To implement the protocol the following steps are performed each time a shared key is required.

(a) A chooses a random integer $x, 1 \leq x \leq p-2$, and sends B message (1) i.e. $\alpha^x \bmod p$.

(b) B chooses a random integer $y, 1 \leq y \leq p-2$, and sends A message (2) i.e. $\alpha^y \bmod p$.

(c) A computes the key $K = (\alpha^y)^a z_B^x \bmod p$.

(d) B computes the key $K = (\alpha^x)^b z_A^y \bmod p$.

(e) Both share the key $K = \alpha^{bx+ay}$.

In order to compute the key K, A must use his secret key a and the random integer x, both of which are known only to him. Similarly B must use her secret key b and random integer y to compute the session key K. Provided the secret keys a,b remain uncompromised, an interloper cannot generate a session key identical to the other correspondent. Accordingly, any ciphertext will not be decipherable by both correspondents.

As such this and related protocols have been considered satisfactory for key establishment and resistant to conventional eavesdropping or man-in-the-middle attacks.

In some circumstances it may be advantageous for an adversary to mislead one correspondent as to the true identity of the other correspondent.

In such an attack an active adversary or interloper E modifies messages exchanged between A and B, with the result that B believes that he shares a key K with E while A believes that she shares the same key K with B. Even though E does not learn the value of K the misinformation as to the identity of the correspondents may be useful.

A practical scenario where such an attack may be launched successfully is the following. Suppose that B is a bank branch and A is an account holder. Certificates are issued by the bank headquarters and within the certificate is the account information of the holder. Suppose that the protocol for electronic deposit of funds is to exchange a key with a bank branch via a mutually authenticated key agreement. Once B has authenticated the transmitting entity, encrypted funds are deposited to the account number in the certificate. If no further authentication is done in the encrypted deposit message (which might be the case to save bandwidth) then the deposit will be made to E's account.

It is therefore an object of the present invention to provide a protocol in which the above disadvantages are obviated or mitigated.

According therefore to the present invention there is provided a method of establishing a session key between a pair of correspondents A,B to permit exchange of information therebetween, each of said correspondents having a respective private key a,b and a public key $p_A, p_B$ derived from a generator $\alpha$ and respective ones of said private keys a,b, said method including the steps of i) a first of said correspondents A selecting a first random integer x and exponentiating a function f(α) including said generator to a power g(x) to provide a first exponentiated function $f(\alpha)^{g(x)}$;

ii) said first correspondent A generating a first signature $s_A$ from said random integer x and said first exponentiated function $f(\alpha)^{g(x)}$;

iii) said first correspondent A forwarding to a second correspondent B a message including said first exponentiated function $f(\alpha)^{g(x)}$;

iv) said correspondent B selecting a second random integer y and exponentiating a function f'(α) including said generator to a power g(y) to provide a second exponentiated function $f'(\alpha)^{g(y)}$ and generating a signature $s_B$ obtained from said second integer y and said second exponentiated function $f(\alpha)^{g(y)}$;

v) said second correspondent B forwarding a message to said first correspondent A including said second exponentiated function $f'(\alpha)^{g(y)}$;

vi) each of said correspondents A and B constructing a session key K by exponentiating information made public by said other correspondent with said random integer that is private to themselves.

Thus although the interloper E can substitute her public key $p_E = \alpha^{ae}$ in the transmission as part of the message, B will use $p_E$ rather than $p_A$ when authenticating the message. Accordingly the computed and transmitted values of the exponential functions will not correspond.

Embodiments of the invention will now be described by way of example only with reference to the accompanying drawings in which:

FIG. 1 is a schematic representation of a data communication system.

Referring therefore to FIG. 1, a pair of correspondents, 10,12, denoted as correspondent A and correspondent B, exchange information over a communication channel 14. A cryptographic unit 16,18 is interposed between each of the correspondents 10,12 and the channel 14. A key 20 is associated with each of the cryptographic units 16,18 to convert plaintext carried between each unit 16,18 and its respective correspondent 10,12 into ciphertext carried on the channel 14.

In operation, a message generated by correspondent A, 10, is encrypted by the unit 16 with the key 20 and transmitted as ciphertext over channel 14 to the unit 18.

The key 20 operates upon the ciphertext in the unit 18 to generate a plaintext message for the correspondent B, 12. Provided the keys 20 correspond, the message received by the correspondent 12 will be that sent by the correspondent 10.

In order for the system shown in FIG. 1 to operate it is necessary for the keys 20 to be identical and therefore a key agreement protocol is established that allows the transfer of information in a public manner to establish the identical keys. A number of protocols are available for such key generation and are variants of the Diffie-Hellman key exchange. Their purpose is for parties A and B to establish a secret session key K.

The system parameters for these protocols are a prime number p and a generator α of the multiplicative group $Z^*_p$. Correspondent A has private key a and public key $p_A = \alpha^a$. Correspondent B has private key b and public key $p_B = \alpha^b$. In the protocol exemplified below, $text_A$ refers to a string of information that identifies party A. If the other correspondent B possesses an authentic copy of correspondent A's public key, then $text_A$ will contain A's public-key certificate, issued by a trusted center; correspondent B can use his authentic copy of the trusted center's public key to verify correspondent A's certificate, hence obtaining an authentic copy of correspondent A's public key.

In each example below it is assumed that, an interloper E wishes to have messages from A identified as having originated from E herself. To accomplish this, E selects a random integer e, $1 \leq e \leq p-2$, computes $p_E = (p_A)^e = \alpha^{ae}$ mod p, and gets this certified as her public key. E does not know the exponent ae, although she knows e. By substituting $text_E$ for $text_A$, the correspondent B will assume that the message originates from E rather than A and use E's public key to generate the session key K. E also intercepts the message from B and uses his secret random integer e to modify its contents. A will then use that information to generate the same session key allowing A to communicate with B.

To avoid interloper E convincing B that he is communicating with E, the following protocol is adapted.

The purpose of the protocol is for parties A and B to establish a session key K. The protocols exemplified are role-symmetric and non-interactive.

The system parameters for this protocol are a prime number p and a generator a of the multiplicative group $Z^*_p$. User A has private key a and public key $p_A = \alpha^a$. User B has private key b and public key $p_B = \alpha^b$.

First Protocol

1. A picks a random integer $x, 1 \leq x \leq p-2$, and computes $r_A = \alpha^x$ and a signature $s_A = x - r_A a \alpha^1$ mod (p−1). A sends $\{r_A, s_A, text_A\}$ to B.

2. B picks a random integer $y, 1 \leq y \leq p-2$, and computes $r_B = \alpha^y$ and a signature $s_B = y - r_B b \alpha^b$ mod (p−1). B sends $\{r_B, s_B, text_B\}$ to A.

3. A computes $\alpha^{s_B}(p_B)^{\alpha^b}$ and verifies that this is equal to $r_B$. A computes the session key $K = (r_B)^x = \alpha^{xy}$.

4. B computes $\alpha^{s_A}(p_A)^{r_A \alpha^a}$ and verifies that this is equal to $r_A$. B computes the session key $K = (r_A)^y = \alpha^{xy}$.

Should E replace $text_A$ with $text_E$, B will compute $\alpha^{s_A}(p_E)^{r_A \alpha^a}$ which will not correspond with the transmitted value of $r_A$. B will thus be alerted to the interloper E and will proceed to initiate another session key.

One draw back of the first protocol is that it does not offer perfect forward secrecy. That is, if an adversary learns the long-term private key a of party A, then the adversary can deduce all of A's past session keys. The property of perfect forward secrecy can be achieved by modifying Protocol 1 in the following way.

Modified First Protocol

In step 1, A also sends $\alpha^{x_1}$ to B, where $x_1$ is a second random integer generated by A. Similarly, in step 2 above, B also sends $\alpha^{y_1}$ to A, where $y_1$ is a random integer. A and B now compute the key $K = \alpha^{xy} e \alpha^{x_1 y_1}$.

Another drawback of the first protocol is that if an adversary learns the private random integer x of A, then the adversary can deduce the long-term private key a of party A from the equation $s_A = x - r_A a \alpha^a$ mod p−1. This drawback is primarily theoretical in nature since a well designed implementation of the protocol will prevent the private integers from being disclosed.

Second Protocol

A second protocol set out below addresses these two drawbacks.

1. A picks a random integer $x, 1 \leq x \leq p-2$, and computes $(p_B)^x, \alpha^x$ and a signature $s_A = x + a \alpha^a (p_B)^x$ mod (p−1). A sends $\{\alpha^x, s_A, text_A\}$ to B.

2. B picks a random integer $y, 1 \leq y < p-2$, and computes $(p_A)^y, \alpha^y$ and a signature $s_B = y + b \alpha^b (p_A)^y$ mod (p−1). B sends $\{\alpha^y, s_B, text_B\}$ to A.

3. A computes $(\alpha^y)^a$ and verifies that $\alpha^{S_B}(p_B)^{-\alpha^b\alpha^{ay}}=\alpha^y$. A then computes session key $K=\alpha^{ay}(p_B)^x$.

4. B computes $(\alpha^x)^b$ and verifies that $\alpha^{S_A}(p_A)^{-\alpha^a\alpha^{bx}}=\alpha^x$. A then computes session key $K=\alpha^{bx}(p_A)^y$.

The second protocol improves upon the first protocol in the sense that if offers perfect forward secrecy. While it is still the case that disclosure of a private random integer x allows an adversary to learn the private key a, this will not be a problem in practice because A can destroy x as soon as she uses it in step 1 of the protocol.

If A does not have an authenticated copy of B's public key then B has to transmit a certified copy of his key to B at the beginning of the protocol. In this case, the second protocol is a three-pass protocol.

The quantity $s_A$ serves as A's signature on the value $\alpha^x$. This signature has the novel property that it can only be verified by party B. This idea can be generalized to all ElGamal-like signatures schemes.

The first and second protocols above can be modified to improve the bandwidth requirements and computational efficiency of the key agreement. The modified protocols are described below as Protocol 1' and Protocol 2'. In each case, A and B will share the common key $\alpha^{sA'B}$.

Protocol 1'

1. A picks a random integer x, $1 \leq x \leq p-2$, and computes $r_A=\alpha^a$ and $s_A=x+r_A a\alpha^a$ mod (p-1). A sends $\{r_A,\text{text}_A\}$ to B.

2. B picks a random integer y, $1 \leq y \leq p-2$, and computes $r_B=\alpha^y$ and $s_B=y+r_B b\alpha^b$ mod (p-1). B sends $\{r_B,\text{text}_B\}$ o A.

3. A computes $K=(r_B(p_B)^{r_B\alpha^y})^{s_A}$ which is equivalent to $\alpha^{s_A s_B}$.

4. B computes $K=(r_A(p_A)^{r_A\alpha^a})^{s_B}$ which is also equivalent to $\alpha^{s_A s_B}$.

A and B thus share the common key but it will be noted that the signatures $s_A$ and $s_B$ need not be transmitted.

Protocol 2'

1. A picks a random integer x, $1 \leq x \leq p-2$, and computes $(p_B)^x$, $\alpha^x$ and $s_A=x+(p_B)^x$ mod (p-1). A sends $\{\alpha^x,\text{text}_A\}$ to B.

2. B picks a random integer y, $1 \leq y \leq p-2$, and computes $(p_A)^y$, $\alpha^y$ and $s_B=y+b(p_A)^y$ mod (p-1). B sends $\{a^y,\text{text}_B\}$ to A.

3. A computes $(\alpha^y)^a$ and $K=(\alpha^y(p_B)^{\alpha^y\alpha^{ay}})^{s_A}$. i.e. $\alpha^{s_A s_B}$.

4. B computes $(\alpha^x)^b$ and $K=(\alpha^x(p_A)^{\alpha^a\alpha^{bx}})^{s_B}$. i.e. $\alpha^{s_A s_B}$.

Again therefore the transmission of $s_A$ and $s_B$ is avoided.

A further protocol is available for parties A and B to establish a session key K.

Third Protocol

The system parameters for this protocol are a prime number p and a generator a for the multiplicative group $Z^*_p$. User A has private key a and public key $p_A=\alpha^a$. User B has private key b and public key $p_B=\alpha^b$.

1. A picks two random integers $x,x_1,1\leq x,x_1\leq p-2$, and computes $r_{x_1}=\alpha^{x_1},r_A=\alpha^x$ and $(r^A)^{rx_1}$, then computes a signature $s_A=xr_{x_1}-(r_A)^{rx_1}a\alpha^a$ mod (p-1). A sends $\{r_A, s_A,\alpha^{x_1},\text{text}_A\}$ to B.

2. B picks two random integers $y,y_1,1\leq y,y_1\leq p-2$, and computes $r_{y_a}=\alpha^{y_1},r_B=\alpha^y$ and $(r^B)^{ry_1}$, then computes a signature $s_B=yr_{y_1}-(r_B)^{ry_1}b$ mod (p-1). B sends $\{r_B,s_B,\alpha^{y_1},\text{text}_B\}$ to A.

3. A computes $\alpha^{s_B}(p_B)^{r_B y_1}$ and verifies that this is equal to $(r_B)ds r^{y_1}$. A computes session key $K=(\alpha^{y_1})^{x_1}=\alpha^{x_1 y_1}$.

4. B computes $\alpha^{s_A}(p_A)^{(r_A)^{x_1}}$ and verifies that this is equal to $(r_A)^{r^a}$. B computes session key $K=(\alpha^{x_1})^{y_1}=\alpha^{x_1 y_1}$.

In these protocols, $(r_A,s_A)$ can be thought of as the signature of $r_{x_1}$ with the property that only A can sign the message $r_{x_1}$.

Key Transport Protocol

The protocols described above permit the establishment and authentication of a session key K. It is also desirable to establish a protocol in which permits A to transport a session key K to party B. Such a protocol is exemplified below.

1. A picks a random integer x, $1 \leq x < p-2$, and computes $r_A=\alpha^x$ and a signature $s_A=x-r_A a\alpha^a$ mod (p-1). A computes session key $K=(p_B)^x$ and sends $\{r_A,s_A,\text{text}_A\}$ to B.

2. B computes $\alpha^{s_A}(p_A)^{r_A\alpha^a}$ and verifies that this quantity is equal to $r_A$. B computes session key $K=(r_A)^b$.

Modified Key Transport Protocol

The above protocol may be modified to reduce the bandwidth by avoiding the need to transmit the signature $s_A$ as follows:

1. A picks a random integer x, $1 \leq x \leq p-2$, and computes $r_A=\alpha^x$ and $s_A=x-r_A a\alpha^a$ mod (p-1). A computes $K=(p^B)^{s_A}$ and sends $\{r_A,\text{text}_A\}$ to B.

2. B computes $K=(\alpha^x(p_A)^{-r_A\alpha^a})^b=\alpha^{bs_A}$.

All one-pass key transport protocols have the following problem of replay. Suppose that a one-pass key transport protocol is used to transmit a session key K from A to B as well as some text encrypted with the session key K. Suppose that E records the transmission from A to B. If E can at a later time gain access to B's decryption machine (but not the internal contents of the machine, such as B's private key), then, by replaying the transmission to the machine, E can recover the original text. (In this scenario, E does not learn the session key K.).

This replay attack can be foiled by usual methods, such as the use of timestamps. There are, however, some practical situations when B has limited computational resources, in which it is more suitable at the beginning of each session, for B to transmit a random bit string k to A. The session key that is used to encrypt the text is then k ⊕ K, i.e. k XOR'd with K.

The signing equation $s_A=x-r_A a\alpha^a$ where $r_A=\alpha^x$ in protocol 1, and the key transportation protocols; $r_A=\alpha^{xb}$ in protocol 2, can be replaced with several variants. Some of them are:

$r_A=s_A x+z$ $s_A=x\alpha^a+ar_A$ $s_A=xr_A+a\alpha^a$ $1=ar_A+xs_A$

All the protocols discussed above have been described in the setting of the multiplicative group $Z^*_p$. However, they can all be easily modified to work in any finite group in which the discrete logarithm problem appears intractable. Suitable choices include the multiplicative group of a finite field (in particular the finite field $GF(2^n)$, subgroups of $Z^*_p$ of order q, and the group of points on an elliptic curve defined over a finite field. In each case an appropriate generator a will be used to define the public keys.

The protocols discussed above can also be modified in a straightforward way to handle the situation when each user picks their own system parameters p and $\alpha$ (or analogous parameters if a group other than $Z^*_p$ is used).

We claim:

1. A method of establishing a session key between a pair of correspondents A,B in a public key data communication system to permit exchange of information therebetween over a communication channel, each of said correspondents having a respective private key a,b and a public key $p_A$, $p_B$ derived from a generator $\alpha$ and respective ones of said private keys a,b, said method including the steps of:

i) a first of said correspondents A selecting a first random integer x and exponentiating a first function f($\alpha$) including said generator to a power g(x) to provide a first exponentiated function $f(\alpha)^{g(x)}$;

ii) said first correspondent A generating a first signature $s_A$ from said random integer x said exponentiated function $f(\alpha)^{g(x)}$ and said private key a to bind said integer x and said private key a;

iii) said first correspondent A forwarding to a second correspondent B a message including said first exponentiated function $f(\alpha)^{g(x)}$;

iv) said correspondent B selecting a second random integer y and exponentiating a second function $f(\alpha)$ including said generator to a power $g(y)$ to provide a second exponentiated function $f(\alpha)^{g(y)}$ and generating a signature $s_B$ obtained from said second integer y said second exponentiated function $f(\alpha)^{g(y)}$ and said private key b to bind said integer y and said private key b;

v) said second correspondent B forwarding a message to said first correspondent A including said second exponentiated function $f(\alpha)^{g(y)}$; and vi) each of said correspondents constructing a session key K by exponentiating information made public by the other correspondent with information that is private to themselves whereby subsequent decryption of information confirms establishment of a common key and thereby the identity of said correspondents.

2. A method of claim 1 wherein said message forwarded by said first correspondent includes an identification of the first correspondent.

3. A method according to claim 1 wherein said message forwarded by said second correspondent includes an identification of said second correspondent.

4. A method according to claim 3 wherein said message forwarded by said first correspondent includes an identification of the first correspondent.

5. A method according to claim 1 wherein said first function $f(\alpha)$ including said generator is said generator itself.

6. A method according to claim 1 wherein said second function $f(\alpha)$ including said generator is said generator itself.

7. A method according to claim 6 wherein said first function $f(\alpha)$ including said generator is said generator itself.

8. A method according to claim 1 wherein said first function $f(\alpha)$ including said generator includes the public key $p_B$ of said second correspondent.

9. A method according to claim 1 wherein said second function $f(\alpha)$ including said generator includes the public key $p_A$ of said first correspondent.

10. A method according to claim 1 wherein said signature generated by a respective one of the correspondents combine the random integer, exponentiated function and private key of that one correspondent.

11. A method according to claim 10 wherein said signature $S_A$ of correspondent A is of the form $x - r_A \, a\alpha^a \bmod (p-1)$.

12. A method according to claim 11 wherein said correspondent A selects a second integer $x_1$ and forwards $r_{A_1}$ to correspondent B where $r_{A_1} = \alpha^{x_1}$ and said correspondent B selects a second random integer $y_1$ and sends $r_{B_1}$ to correspondent A, where $r_{B_1} = \alpha^{y_1}$ each of said correspondents computing a pair of keys $k_1, k_2$ equivalent to $\alpha^{xy}$ and $\alpha^{x_1 y_1}$ respectively, said session key K being generated by XORing $k_1$ and $k_2$.

13. A method according to claim 10 wherein said signature $S_A$ of correspondent A is of the form $x + a\alpha^a (p_B)^x \bmod (p-1)$.

14. A method according to claim 10 wherein said signature $S_A$ of correspondent A is of the form $xr_{x_1} - (r_a)^{r_{x_1}} a \bmod (p-1)$ where $x_1$ is a second random integer selected by A and $r_{x_1} = \alpha^{x_1}$.

15. A method according to claim 10 wherein said signature $S_B$ of correspondent B is of the form $y_B - r_B b\alpha^b \bmod (p-1)$.

16. A method according to claim 10 wherein said signature $S_B$ of correspondent B is of the form $y + b\alpha^b (p_A)^y \bmod (p-1)$.

17. A method according to claim 10 wherein said signature $S_B$ of correspondent B is of the form $yr_{y_1} - (r_B)^{r_{y_1}} b \bmod (p-1)$ where $y_1$ is a second integer selected by correspondent B and $r_{y_1} = \alpha^{y_1}$.

* * * * *

UNITED STATES PATENT AND TRADEMARK OFFICE
CERTIFICATE OF CORRECTION

PATENT NO. : 5,761,305
APPLICATION NO. : 08/442833
DATED : June 2, 1998
INVENTOR(S) : Scott A. Vanstone, Alfred John Menezes and Minghua Qu Page 1 of 1

It is certified that error appears in the above-identified patent and that said Letters Patent is hereby corrected as shown below:

Title page, item (73), "Assignee: Certicom Corporation, Ontario, Canada" should read as --Assignee: Certicom Corp., Mississauga (CA)--

Signed and Sealed this
Twenty-fourth Day of September, 2013

Teresa Stanek Rea
*Deputy Director of the United States Patent and Trademark Office*